(12) United States Patent
Taira et al.

(10) Patent No.: US 10,079,111 B2
(45) Date of Patent: Sep. 18, 2018

(54) METHOD FOR PRODUCING ELECTRODE MATERIAL FOR ALUMINUM ELECTROLYTIC CAPACITORS, AND ELECTRODE MATERIAL FOR ALUMINUM ELECTROLYTIC CAPACITORS

(71) Applicant: TOYO ALUMINIUM KABUSHIKI KAISHA, Osaka-shi, Osaka (JP)

(72) Inventors: Toshifumi Taira, Osaka (JP); Kenji Muramatsu, Osaka (JP)

(73) Assignee: TOYO ALUMINIUM KABUSHIKI KAISHA, Osaka-shi, Osaka (JP)

( * ) Notice: Subject to any disclaimer, the term of this patent is extended or adjusted under 35 U.S.C. 154(b) by 399 days.

(21) Appl. No.: 14/654,722

(22) PCT Filed: Jan. 15, 2014

(86) PCT No.: PCT/JP2014/050511
§ 371 (c)(1),
(2) Date: Jun. 22, 2015

(87) PCT Pub. No.: WO2014/112499
PCT Pub. Date: Jul. 24, 2014

(65) Prior Publication Data
US 2015/0371782 A1   Dec. 24, 2015

(30) Foreign Application Priority Data
Jan. 18, 2013  (JP) ................................ 2013-007381

(51) Int. Cl.
| | | |
|---|---|---|
| *H01B 1/02* | (2006.01) | |
| *H01G 9/00* | (2006.01) | |
| *H01G 9/055* | (2006.01) | |
| *H01G 9/045* | (2006.01) | |
| *C25F 3/04* | (2006.01) | |

(52) U.S. Cl.
CPC ............. *H01G 9/0029* (2013.01); *C25F 3/04* (2013.01); *H01G 9/045* (2013.01); *H01G 9/055* (2013.01); *H01B 1/02* (2013.01)

(58) Field of Classification Search
CPC ........................................................ H01B 1/02
See application file for complete search history.

(56) References Cited

U.S. PATENT DOCUMENTS

| | | |
|---|---|---|
| 2004/0087102 A1 | 5/2004 | Nagai et al. |
| 2011/0038098 A1* | 2/2011 | Taira ..................... H01G 9/045 |
| | | 361/500 |
| 2014/0098460 A1 | 4/2014 | Taira et al. |

FOREIGN PATENT DOCUMENTS

| | | |
|---|---|---|
| CN | 1488155 A | 4/2004 |
| CN | 1774778 A | 5/2006 |
| JP | 2-91918 A | 3/1990 |
| JP | 2-267916 A | 11/1990 |
| JP | 2006-108159 A | 4/2006 |
| JP | 2008-98279 A | 4/2008 |
| JP | 2011-29558 A | 2/2011 |
| JP | 2012-54448 A | 3/2012 |
| JP | 2013-74081 A | 4/2013 |
| JP | 2013-157392 A | 8/2013 |
| TW | 201303938 A1 | 1/2013 |
| WO | 2004/093106 A2 | 10/2004 |

OTHER PUBLICATIONS

Office Action dated Mar. 20, 2017, issued in counterpart Chinese Application No. 201480004009.8, with English translation. (13 pages).
International Search Report dated Feb. 25, 2014, issued in corresponding application No. PCT/JP2014/050511 (2 pages).
Office Action dated Sep. 20, 2017, issued in counterpart Chinese Patent Application No. 201480004009.8 (15 pages; w/ English machine translation).

* cited by examiner

Primary Examiner — William D Young
(74) Attorney, Agent, or Firm — Westerman, Hattori, Daniels & Adrian, LLP

(57) ABSTRACT

The present invention provides a production method that enables easy production of an electrode material for aluminum electrolytic capacitor having a high capacitance, and that enables, in particular, easy production of an electrode material for aluminum electrolytic capacitor having a high capacitance regardless of the average particle diameter (D50) of aluminum powder to be used. Specifically, the present invention provides a method for producing an electrode material for aluminum electrolytic capacitor, comprising the steps of: (1) a first step of forming a film of a paste composition containing powder of at least one of aluminum and an aluminum alloy, a binder resin, and a solvent on at least one surface of a substrate, (2) a second step of sintering the film, and (3) a third step of applying an etching treatment on the sintered film.

8 Claims, No Drawings

METHOD FOR PRODUCING ELECTRODE MATERIAL FOR ALUMINUM ELECTROLYTIC CAPACITORS, AND ELECTRODE MATERIAL FOR ALUMINUM ELECTROLYTIC CAPACITORS

TECHNICAL FIELD

The present invention relates to a method for producing an electrode material to be used for aluminum electrolytic capacitor, and an electrode material for aluminum electrolytic capacitor.

BACKGROUND ART

With their characteristic properties, aluminum electrolytic capacitors have hitherto been widely used in the energy field. Examples of the application of aluminum electrolytic capacitors include compact electronics such as cellular phones, household electric appliances such as televisions, inverter power supplies for hybrid vehicles, and storage of wind-generated electricity. In these various applications of aluminum electrolytic capacitors, there is a demand for a high-capacitance property at the voltage to be used in each application.

An aluminum electrolytic capacitor characterized by using an aluminum foil having a fine aluminum powder adhering to the surface thereof has been proposed (for example, Patent Document 1). Another example of a known electrolytic capacitor is one that has an electrode foil in which an aggregate of fine particles made of aluminum that is self-similar in the length range of 2 µm to 0.01 µm and/or aluminum having an aluminum oxide layer on the surface is adhered to one side or both sides of a smooth aluminum foil having a thickness of not less than 15 µm to less than 35 µm (Patent Document 2).

However, the methods disclosed in these documents, wherein plating and/or vacuum evaporation is used to adhere aluminum powder to an aluminum foil, are insufficient, at least for obtaining medium- to high-voltage capacitors.

Further, an electrode material for an aluminum electrolytic capacitor made from a sintered body of at least one of aluminum and aluminum alloy is disclosed as an electrode material for aluminum electrolytic capacitor (for example, Patent Document 3). This sintered body has a distinct structure, which is obtained by sintering a laminate in which aluminum or aluminum alloy powder particles are stacked while providing a space between the particles. Because of this structure, an electrostatic capacitance equivalent to or greater than that of a conventional etched foil can be obtained (paragraph [0012] of Document 3). The capacitance of this electrode material can be increased by increasing the amount or thickness of the particles of the laminate.

However, the above electrode material has a drawback in which the increase in thickness for increasing the capacitance causes difficulty in forming anodic oxide film (dielectric) on the electrode surface in the chemical conversion step. Therefore, if the capacitance per lamination unit quantity (thickness) can be increased, the thickness of the electrode material can be reduced. For example, if the capacitance per lamination thickness can be increased by 10%, the thickness of the electrode material can be reduced by 9% relative to the core material, thereby reducing the size of the capacitor.

The aluminum powder used as the raw material is obtained by classification of atomized powder (powder obtained by spattering a thin stream of molten aluminum by high-speed spray of nitrogen or the like, and then cooling the resulting particles). Among the classified powder, powder having an average particle diameter ($D_{50}$) of 2 to 6 µm is used for an electrode material so as to ensure a high capacitance. It is difficult to obtain a desired capacitance when powder having a large average particle diameter is used.

However, among the powder produced by an atomizing method, powder having a small average particle diameter is only less than 50% based on the total weight. Therefore, this method has a problem of treatment of powder having a large average particle diameter. Thus, if an electrode material having a high capacitance can be obtained regardless of the average particle diameter of the aluminum powder to be used as a material, the yield of atomized powder will be greatly increased and the production cost can be reduced. As such, a need has arisen for the development of a method for producing an electrode material having a high capacitance regardless of the average particle diameter of aluminum powder.

CITATION LIST

Patent Documents

Patent Document 1: JPH02-267916A
Patent Document 2: JP2006-108159A
Patent Document 3: JP2008-98279A

SUMMARY OF INVENTION

Technical Problem

An object of the present invention is to provide a production method that enables easy production of an electrode material for aluminum electrolytic capacitor having a high capacitance, and that enables, in particular, easy production of an electrode material for aluminum electrolytic capacitor having a high capacitance regardless of the average particle diameter ($D_{50}$) of aluminum powder to be used.

Solution to Problem

The inventors of the present invention conducted extensive research to attain the above object, and found that the object can be achieved by a method of forming a film made of a paste composition containing powder of aluminum etc. on a substrate, sintering the film, and applying an etching treatment on the film. With this finding, the inventors completed the present invention.

More specifically, the present invention relates to the following production methods for an electrode material for aluminum electrolytic capacitor, and the electrode material for aluminum electrolytic capacitor produced by the production method.

Item 1:
A method for producing an electrode material for aluminum electrolytic capacitor, comprising the steps of:
(1) a first step of forming a film of a paste composition containing powder of at least one of aluminum and an aluminum alloy, a binder resin, and a solvent on at least one surface of a substrate,
(2) a second step of sintering the film, and
(3) a third step of applying an etching treatment on the sintered film.

Item 2:

The method according to Item 1, wherein the etching treatment is at least one selected from the group consisting of chemical etching using an acidic solution, chemical etching using an alkaline solution, DC electrolytic etching, and AC electrolytic etching.

Item 3:

The method according to Item 1 or 2, wherein the etching treatment first performs chemical etching using an acidic solution or chemical etching using an alkaline solution, and then performs DC electrolytic etching or AC electrolytic etching.

Item 4:

The method according to Item 1 or 2, wherein the etching treatment is chemical etching using an acidic solution, chemical etching using an alkaline solution, or DC electrolytic etching.

Item 5:

The method according to Item 1 or 2, wherein the etching treatment is AC electrolytic etching.

Item 6:

The method according to any one of Items 1 to 5, wherein the powder has an average particle diameter $D_{50}$ of 1 to 80 μm.

Item 7:

The method according to any one of Items 1 to 6, wherein the sintering temperature is not lower than 560° C. and not higher than 660° C.

Item 8:

The method according to any one of Items 1 to 7, wherein the thickness of the film after the sintering is 5 to 1000 μm.

Item 9:

An electrode material for aluminum electrolytic capacitor produced by the method according to any one of Items 1 to 8.

Advantageous Effects of Invention

The present invention enables easy production of an electrode material for aluminum electrolytic capacitor having a high capacitance by a method of forming a film made of a paste composition containing powder of at least one of aluminum and an aluminum alloy, a binder resin, and a solvent on at least one surface of a substrate, sintering the film, and applying an etching treatment on the sintered film. With this method, the present invention enables reduction in thickness of an electrode material and thereby enables reduction in size of a capacitor that is produced using the electrode material.

Moreover, by further applying an etching treatment on a sintered film, it becomes possible to produce an electrode material for aluminum electrolytic capacitor having a high capacitance even when powder of aluminum or the like having a large average particle diameter ($D_{50}$) is used, thereby producing an electrode material for aluminum electrolytic capacitor having a high capacitance regardless of the average particle diameter ($D_{50}$) of the powder of aluminum or the like to be used.

As such, since the production method for an electrode material of the present invention enables production of an electrode material for aluminum electrolytic capacitor having a high capacitance even when powder of aluminum or the like with a large average particle diameter ($D_{50}$) is used, the method enables use of powder having a large average particle diameter that is produced after the classification during the manufacture of powder of aluminum or the like by an atomizing method, thereby greatly improving the yield of the atomized powder and reducing the production cost.

DESCRIPTION OF EMBODIMENTS

The method for producing an electrode material for aluminum electrolytic capacitor of the present invention comprises (1) a first step of forming a film made of a paste composition containing powder of at least one of aluminum and an aluminum alloy, a binder resin, and a solvent on at least one surface of a substrate, (2) a second step of sintering the film, and (3) a third step of applying an etching treatment on the sintered film. Each step is explained below.

First Step

In the first step, a film of a paste composition containing powder of at least one of aluminum and an aluminum alloy, a binder resin, and a solvent is formed on at least one surface of a substrate.

For example, a pure aluminum powder having a purity of 99.8 wt % or more is preferably used as the raw material. For the aluminum alloy powder that may also be used as the raw material, alloys containing one or more elements selected from silicon (Si), iron (Fe), copper (Cu), manganese (Mn), magnesium (Mg), chromium (Cr), zinc (Zn), titanium (Ti), vanadium (V), gallium (Ga), nickel (Ni), boron (B), zirconium (Zr), and the like, is preferably used. The content of each of these elements in the aluminum alloy is preferably not more than 100 weight ppm, more preferably not more than 50 weight ppm.

The powder preferably has an average particle diameter $D_{50}$ before sintering of 1 to 80 μm. In particular, an aluminum powder having an average particle diameter $D_{50}$ of 1 to 15 μm can be preferably used for an electrode material for use in medium- to high-capacitance aluminum electrolytic capacitors. Further, the lower limit of the average particle diameter $D_{50}$ of the powder may be 3 μm or 9 μm. The production method of the present invention enables production of a high capacitance electrode material even when powder having the above lower limit of the average particle diameter $D_{50}$ is used. This is conducive to improvement in the yield of atomized powder, thereby reducing the production cost.

The term "average particle diameter $D_{50}$" in the present specification designates a particle size corresponding to 50% of all the particles in a particle size distribution curve that is obtained by finding particle diameters and the number of particles having the respective diameters using laser diffractometry. The average particle diameter $D_{50}$ of the powder after sintering is measured by observing the cross sections of the sintered body with a scanning electron microscope. For example, the powder after sintering is in a state wherein a portion thereof is melted or the particles are partially connected to each other; however, the portion having a nearly circular shape can be approximated as particles. Therefore, using particle diameters of these particles, the average particle diameter $D_{50}$ of powder after sintering is defined as the particle diameter corresponding to 50% of all the particles in the particle size distribution curve, which is calculated based on the particle diameters and the number of particles corresponding to the respective particle diameters. The average particle diameter $D_{50}$ before sintering and the average particle diameter $D_{50}$ after sintering obtained above are almost the same. Further, the average particle diameters $D_{50}$ before and after the film rolling prior to the sintering are also substantially the same.

There is no particular limitation to the shape of the powder, and a spherical, amorphous, scaly, fibrous, or other shape may be suitably used. A powder of spherical particles is particularly preferable.

The above powder may be produced by any known method. Examples of usable methods include an atomizing method, a melt spinning process, a rotating disk method, a rotating electrode process, and rapid solidification processes. In terms of industrial production, an atomizing method, in particular, a gas atomizing method, is preferable. More specifically, a powder obtained by atomizing molten metal is preferably used.

The paste composition contains a binder resin and a solvent, in addition to the above-described powder of at least one of aluminum and an aluminum alloy. For these, known or commercially available products can be used.

Resin binders are not limited, and suitable examples thereof include carboxy-modified polyolefin resins, vinyl acetate resins, vinyl chloride resins, vinyl chloride-vinyl acetate copolymers, vinyl alcohol resins, butyral resins, polyvinyl fluoride, acrylic resins, polyester resins, urethane resins, epoxy resins, urea resins, phenol resins, acrylonitrile resins, cellulose resins, paraffin wax, polyethylene wax, and other synthetic resins or waxes; and tar, glue, sumac, pine resin, beeswax, and other natural resins or waxes. These binders are divided into, depending on the molecular weight, the type of resin, etc., those that volatilize upon heating and those that remain as a residue together with aluminum powder as a result of pyrolysis. A suitable binder is selected depending on the desired electrostatic characteristics, etc.

For the solvent, any known solvents may be used. For example, water as well as organic solvents, such as ethanol, toluene, ketones, and esters, may be used.

The paste composition may contain, if necessary, other components such as sintering aids, surfactants, etc. For these, known or commercially available products can be used. By using such a paste composition containing the above components, it is possible to efficiently form a film.

In the first step, a film is formed by applying the paste composition on at least one surface of a substrate. Although the substrate is not particularly limited, an aluminum foil can be suitably used.

There is no particular limitation on the aluminum foil used as a substrate. Pure aluminum or an aluminum alloy can be used. The composition of the aluminum foil used in the present invention include an aluminum alloy that contains a necessary amount of at least one alloy element selected from silicon (Si), iron (Fe), copper (Cu), manganese (Mn), magnesium (Mg), chromium (Cr), zinc (Zn), titanium (Ti), vanadium (V), gallium (Ga), nickel (Ni), and boron (B), or aluminum containing a limited amount of the aforementioned elements as unavoidable impurities.

Although there is no particular limitation on the thickness of the aluminum foil, the thickness is preferably not less than 5 μm and not more than 100 μm, and particularly preferably not less than 10 μm and not more than 50 μm.

An aluminum foil produced by a known method can be used as the aluminum foil of the present invention. Such an aluminum foil can be obtained, for example, by preparing a molten metal of aluminum or an aluminum alloy of the above-specified composition, casting the molten metal to obtain an ingot, and subjecting the ingot to appropriate homogenization. The resulting ingot is then subjected to hot rolling and cold rolling to obtain an aluminum foil.

During the aforementioned cold rolling process, intermediate annealing may be conducted at a temperature within the range of not lower than 50° C. to not higher than 500° C., in particular, not lower than 150° C. to not higher than 400° C. Further, an annealing process at a temperature range of not lower than 150° C. to not higher than 650° C., in particularly, not lower than 350° C. to not higher than 550° C., may be performed after the cold rolling process to obtain a soft foil.

Further, a resin may be used as a substrate. In particular, resins (resin films) are usable when the substrate is volatilized at the sintering and only the film is left.

The film is formed on at least one surface of the substrate. When forming the sintered body on both sides of the substrate, the films are preferably symmetrically disposed with the substrate in between. The total film thickness is preferably in the range of 5 to 1,150 μm, and more preferably in the range of 20 to 570 μm. This total film thickness is determined so that the sintered body ultimately obtained after rolling and sintering has a total thickness of 5 to 1,000 μm. These values are applied in both the case of forming a film on one side of the substrate and the case of forming a film on both sides of the substrate. However, in the case of forming a film on both sides of the substrate, the thickness of the film on each side is preferably ⅓ or more of the entire thickness (including the thickness of the substrate).

The average thickness of the film is an average value obtained by measuring the thickness at seven points using a micrometer, and averaging the five values excluding the maximum and minimum values.

Each film may be dried at a temperature within the range of not lower than 20° C. to not higher than 300° C., if necessary.

The formation of the film is not particularly limited, and any hitherto-known method can be used. The formation of the film may be performed, for example, by a film-coating method that applies a paste composition by rolling, brushing, spraying, dipping or a like coating process, or by a known printing method such as silk-screen printing.

Through the first step thus explained, a film made of a paste composition containing powder of at least one of aluminum and an aluminum alloy, a binder resin, and a solvent is formed on at least one surface of a substrate.

Second Step

In the second step, the film is sintered. The sintering temperature is preferably in the range of 560° C. to 660° C., more preferably in the range of 570° C. to 650° C., and further preferably in the range of 580° C. to 620° C. The sintering time can be suitably determined generally within the range of about 5 to 24 hours, although it depends on the sintering temperature, etc. The sintering atmosphere is not particularly limited, and may be any of a vacuum atmosphere, an inert gas atmosphere, an oxidizing gas atmosphere (air), a reducing atmosphere, and the like. In particular, a vacuum atmosphere or a reducing atmosphere is preferable. The pressure conditions may also be any of a normal pressure, a reduced pressure, and an increased pressure.

After the first step but prior to the second step, a heat treatment (degreasing treatment) is preferably conducted at a temperature within the range of not lower than 100° C. to not higher than 600° C. with a retention time of 5 hours or more. The heating atmosphere is not particularly limited; and may be, for example, any of a vacuum atmosphere, an inert gas atmosphere, and an oxidizing gas atmosphere. The pressure conditions may also be any of a normal pressure, a reduced pressure, and an increased pressure.

Through the second step thus explained, a film formed on at least one surface of the substrate is sintered.

Third Step

In the third step, an etching treatment is applied on the sintered film. The etching treatment is not particularly limited; however, the etching treatment is preferably at least one selected from the group consisting of chemical etching using an acidic solution, chemical etching using an alkaline solution, DC electrolytic etching, and AC electrolytic etching. By applying these etching treatments, it is possible to increase the surface area of the obtained electrode material for capacitor, thereby obtaining an electrode material for aluminum electrolytic capacitor having a high capacitance.

The acidic solution used for the chemical etching using an acidic solution is not particularly limited, and any known mixed acid aqueous solution containing one or two acids selected from hydrochloric acid, sulfuric acid, phosphoric acid, nitric acid, and the like may be used. The concentration of the acidic solution may be appropriately adjusted depending on the desired characteristics of the target electrode material, which may be an electrode material for aluminum electrolytic capacitor that exhibits a high capacitance in a low-voltage range, an electrode material for aluminum electrolytic capacitor that exhibits a high capacitance in a high-voltage range, or an electrode material for aluminum electrolytic capacitor that exhibits a high capacitance in both ranges. However, the concentration of the acidic solution is preferably 1 to 30 wt %. Further, the etching temperature and the etching time may be appropriately adjusted depending on the shape of the etching portion and the etching depth; however, the etching is preferably performed at 20° C. to 90° C. for about 1 to 30 minutes.

The alkaline solution used for the chemical etching using an alkaline solution is not particularly limited. For example, an alkaline solution (aqueous solution) such as sodium hydroxide may be used. The concentration of the alkaline solution may be appropriately adjusted depending on the desired characteristics of a desired electrode material, such as an electrode material for aluminum electrolytic capacitor that exhibits a high capacitance in a low-voltage range, an electrode material for aluminum electrolytic capacitor that exhibits a high capacitance in a high-voltage range, or an electrode material for aluminum electrolytic capacitor that exhibits a high capacitance in both regions. However, the concentration of the alkaline solution is preferably about 1 to 30 wt %. Further, the etching temperature and the etching time may be appropriately adjusted depending on the shape of the etching portion and the etching depth; however, the etching is generally preferably performed at 20 to 90° C. for about 1 to 30 minutes.

The concentration of the electrolyte solution used in the DC electrolytic etching is not particularly limited. For example, for a mixed solution of hydrochloric acid and sulfuric acid, the concentration is appropriately adjusted so that the hydrochloric acid concentration falls within the range of 0.1 to 3 mol/L, and the sulfuric acid concentration falls within 0.1 to 5 mol/L. The temperature of the electrolyte solution is not particularly limited; however, the temperature is preferably 30 to 95° C. The treatment time is generally preferably about 10 seconds to 2 minutes, although it depends on the concentration of the electrolyte solution, the treatment temperature, and the like. The amount of electricity is not limited; however, the amount of electricity is preferably about 1 to 50 coulomb/cm$^2$. Further, the current density is generally preferably about 100 to 1000 mA/cm$^2$.

The concentration of the electrolyte solution used in the AC electrolytic etching is not particularly limited. For example, for a mixed solution of hydrochloric acid and sulfuric acid, the concentration is appropriately adjusted so that the hydrochloric acid concentration falls within the range of 0.1 to 3 mol/L, and the sulfuric acid concentration falls within 0.1 to 5 mol/L. The temperature of the electrolyte solution is not particularly limited; however, the temperature is preferably 30 to 95° C. The treatment time is generally preferably about 10 seconds to 2 minutes, although it depends on the concentration of the electrolyte solution, the treatment temperature, and the like. The amount of electricity is not limited; however, the amount of electricity is preferably about 1 to 50 coulomb/cm$^2$. Further, the current density is generally preferably about 100 to 1000 mA/cm$^2$.

By applying a suitable etching treatment selected among these etching treatment methods, it is possible to obtain an electrode material having any desired characteristics. For example, by performing chemical etching using an acidic solution, chemical etching using an alkaline solution, or DC electrolytic etching, it is possible to obtain an electrode material that ensures a high capacitance at a high-voltage range, e.g., at about 250 to 550V. The following is assumed to be the reason such an electrode material can be obtained.

It is assumed that the chemical etching using an alkaline solution has a high effect of dissolving an aluminum surface an oxide film, and that therefore, the chemical etching using an alkaline solution normalizes the gaps between the aluminum particles of the electrode material, thereby enlarging the surface area of the ultimately obtained chemical conversion coating film. Further, the chemical etching using an acidic solution is assumed to dissolve the aluminum surface of the electrode material and form tunnel-shaped etching pits on the aluminum powder at the same time. Further, the DC electrolytic etching is assumed to promote the formation of the tunnel-shaped etching pits on the aluminum powder of the electrode material.

Further, by applying AC electrolytic etching, it is possible to obtain an electrode material that ensures a high capacitance in a low-voltage range, i.e., 10V or less. This is presumably because the AC electrolytic etching forms sponge-like etching pits on the substrate and the powder layer on the substrate.

Further, by further applying DC electrolytic etching or AC electrolytic etching after the chemical etching using an acidic solution or the chemical etching using an alkaline solution, it is possible to obtain an electrode material that ensures a high capacitance both in a low-voltage range, i.e., 10V or less, and in a high-voltage range, i.e., 250 to 550V. This is presumably because the etching pits can be more easily formed by performing the electrolytic etching after removing the aluminum oxide film by chemical etching.

In the third step, the above etching treatments may be appropriately combined according to the target use so as to obtain an electrode material for aluminum electrolytic capacitor having the desired characteristics.

Through the third step thus explained, an electrode material for aluminum electrolytic capacitor is produced.

EXAMPLES

The present invention is more specifically explained below in reference to Examples and Comparative Examples. However, the present invention is not limited to those examples.

The electrode materials of the Examples and the Comparative Examples were prepared according to the following procedure. The capacitance of each electrode material was measured by the method below.

Capacitance

After each electrode material was subjected to a chemical conversion treatment at 5, 10, 250, 400, and 550V in an aqueous boric acid solution (50 g/L), the capacitance was measured in an aqueous ammonium borate solution (3 g/L). The measured projected area was 10 cm².

Comparative Example 1 and Examples 1 to 8

Comparative Example 1

An aluminum powder with an average particle diameter $D_{50}$ of 3.0 μm (JIS A1080, a product of Toyo Aluminum K.K., AHUZ58FN) was mixed with a coating binder acrylic resin (Toyo Ink Co., Ltd.), and the mixture was dispersed in a solvent (toluene-IPA) to obtain a solid content coating composition. The coating composition was applied to both sides of a 20 μm-thick aluminum foil substrate (SB material) using a comma coater so that each film had a thickness of 50 μm after the sintering. After the films were dried, the aluminum foil was sintered in an argon gas atmosphere at 615° C. for 7 hours to produce an electrode material of Comparative Example 1. The thickness of the electrode material after sintering was about 120 μm.

Examples 1 to 8

Using the electrode material obtained in Comparative Example 1, electrode materials of Examples 1 to 8 were produced by performing an etching treatment in the conditions below.

Example 1

Chemical Etching Using an Acidic Solution
Etchant: a mixture of hydrochloric acid and sulfuric acid (hydrochloric acid concentration: 1 mol/L, sulfuric acid concentration: 3 mol/L, concentration: 15%), Temperature: 40° C., Etching Time: 2 min Example 2

Chemical Etching Using an Alkaline Solution
Etchant: sodium hydroxide (Concentration: 5%), Temperature: 25° C., Etching Time: 2 min Example 3

DC Electrolytic Etching
Etchant: hydrochloric acid aqueous solution (hydrochloric acid concentration: 15%), Temperature: 80° C., Electrolysis: DC30A/50 cm²×10 sec Example 4

AC Electrolytic Etching
Etchant: hydrochloric acid aqueous solution (hydrochloric acid concentration 15%), Temperature: 55° C., Electrolysis: AC30A/50 cm²×10 sec Example 5

Chemical Etching Using an Acidic Solution
Etchant: hydrochloric acid aqueous solution (hydrochloric acid concentration 15%), Temperature: 40° C., Etching Time: 2 min After the chemical etching using an acidic solution was performed, the following DC electrolytic etching was performed.
DC Electrolytic Etching
Etchant: hydrochloric acid aqueous solution (hydrochloric acid concentration 15%), Temperature: 80° C., Electrolysis: DC30A/50 cm²×10 sec Example 6

Chemical Etching Using an Acidic Solution
Etchant: hydrochloric acid aqueous solution (hydrochloric acid concentration 15%), Temperature 40° C., Etching Time: 2 min After the chemical etching using an acidic solution was performed, the following AC electrolytic etching was performed.
AC Electrolytic Etching
Etchant: hydrochloric acid aqueous solution (hydrochloric acid concentration 15%), Temperature: 55° C., Electrolysis: AC30A/50 cm²×10 sec Example 7

Chemical Etching Using an Alkaline Solution
Etchant: sodium hydroxide (concentration 5%), Temperature 25° C., Etching Time: 2 min After the chemical etching using an alkaline solution was performed, the following DC electrolytic etching was performed.
DC Electrolytic Etching
Etchant: hydrochloric acid aqueous solution (hydrochloric acid concentration 15%), Temperature: 80° C., Electrolysis: DC30A/50 cm²×10 sec Example 8

Chemical Etching Using an Alkaline Solution
Etchant: sodium hydroxide (concentration 5%), Temperature: 25° C., Etching Time: 2 min After the chemical etching using an alkaline solution was performed, the following AC electrolytic etching was performed.
AC Electrolytic Etching
Etchant: hydrochloric acid aqueous solution (hydrochloric acid concentration 15%), Temperature: 55° C., Electrolysis: AC30A/50 cm²×10 sec Table 1 shows the results.

TABLE 1

| | Capacitance (μF/10 cm²) Chemical Conversion Voltage | | | | |
|---|---|---|---|---|---|
| | 5 V | 10 V | 250 V | 400 V | 550 V |
| Comparative Example 1 | 652 | 533 | 28.8 | 14.6 | 9.18 |
| Example 1 | 657 | 549 | 31.1 | 16.4 | 10.2 |
| Example 2 | 639 | 530 | 30.6 | 15.9 | 10.4 |
| Example 3 | 662 | 568 | 32.2 | 17 | 11.3 |
| Example 4 | 1108 | 879 | 28.1 | 14.4 | 9.08 |
| Example 5 | 701 | 583 | 34.8 | 18.1 | 12.8 |
| Example 6 | 1332 | 958 | 30.4 | 15.7 | 10 |
| Example 7 | 697 | 581 | 34.3 | 17.5 | 12.1 |
| Example 8 | 1378 | 992 | 30.8 | 16.2 | 10.6 |

Comparative Example 2 and Examples 9 to 16

Electrode materials of Comparative Example 2 and Examples 9 to 16 were produced in the same manner as in Comparative Example 1 and Examples 1 to 8, except that an aluminum powder with an average particle diameter $D_{50}$ of 9.0 µm (JIS A1080, a product of Toyo Aluminum K.K., AHUZ560F) was used instead of an aluminum powder with an average particle diameter $D_{50}$ of 3.0 µm. The capacitances of the obtained electrode materials were measured. Table 2 shows the results.

TABLE 2

| | Capacitance (µF/10 cm²) Chemical Conversion Voltage | | | | |
|---|---|---|---|---|---|
| | 5 V | 10 V | 250 V | 400 V | 550 V |
| Comparative Example 2 | 273 | 192 | 15.7 | 9.54 | 6.24 |
| Example 9 | 271 | 189 | 17.3 | 10.3 | 7.05 |
| Example 10 | 266 | 183 | 17.5 | 10 | 7.11 |
| Example 11 | 301 | 208 | 18.1 | 10.8 | 7.56 |
| Example 12 | 470 | 323 | 15.2 | 9.48 | 6.11 |
| Example 13 | 296 | 200 | 19.5 | 11.5 | 7.69 |
| Example 14 | 555 | 423 | 16.9 | 10.1 | 7.09 |
| Example 15 | 282 | 194 | 19.8 | 11.6 | 7.81 |
| Example 16 | 542 | 410 | 17.1 | 9.77 | 7.06 |

Comparative Example 3 and Examples 17 to 24

Electrode materials of Comparative Example 3 and Examples 17 to 24 were produced in the same manner as in Comparative Example 1 and Examples 1 to 8, except that an aluminum powder with an average particle diameter $D_{50}$ of 9.0 µm (JIS A1080, a product of Toyo Aluminum K.K., AHUZ560F) was used instead of an aluminum powder with an average particle diameter $D_{50}$ of 3.0 µm, and that each of the films formed on the aluminum foil substrate (SB material) had a thickness of 100 µm after the sintering. The capacitances of the obtained electrode materials were measured. Table 3 shows the results.

TABLE 3

| | Capacitance (µF/10 cm²) Chemical Conversion Voltage | | | | |
|---|---|---|---|---|---|
| | 5 V | 10 V | 250 V | 400 V | 550 V |
| Comparative Example 3 | 528 | 362 | 31.1 | 18.9 | 12.1 |
| Example 17 | 524 | 354 | 33.9 | 19.9 | 13.7 |
| Example 18 | 515 | 343 | 34.3 | 19.5 | 14 |
| Example 19 | 552 | 383 | 35.2 | 20.5 | 14.6 |
| Example 20 | 937 | 640 | 30.2 | 18.4 | 12.1 |
| Example 21 | 587 | 377 | 37.1 | 22 | 14.9 |
| Example 22 | 1080 | 805 | 33.4 | 19.1 | 13.6 |
| Example 23 | 542 | 366 | 38.8 | 23 | 15.2 |
| Example 24 | 1068 | 778 | 32.8 | 22.7 | 13.4 |

Comparative Example 4 and Examples 25 to 32

Electrode materials of Comparative Example 4 and Examples 25 to 32 were produced in the same manner as in Comparative Example 1 and Examples 1 to 8, except that an aluminum powder with an average particle diameter $D_{50}$ of 30.0 µm was used instead of an aluminum powder with an average particle diameter $D_{50}$ of 3.0 µm. The capacitances of the obtained electrode materials were measured. Table 4 shows the results.

TABLE 4

| | Capacitance (µF/10 cm²) Chemical Conversion Voltage | | | | |
|---|---|---|---|---|---|
| | 5 V | 10 V | 250 V | 400 V | 550 V |
| Comparative Example 4 | 72 | 51 | 4.11 | 2.59 | 1.8 |
| Example 25 | 76 | 53 | 4.5 | 2.78 | 1.92 |
| Example 26 | 70 | 50 | 4.43 | 2.66 | 1.84 |
| Example 27 | 81 | 58 | 4.75 | 3.01 | 2.07 |
| Example 28 | 124 | 85 | 4.06 | 2.43 | 1.66 |
| Example 29 | 84 | 62 | 4.87 | 3.23 | 2.15 |
| Example 30 | 148 | 107 | 4.42 | 2.73 | 1.87 |
| Example 31 | 92 | 69 | 5.13 | 3.41 | 2.29 |
| Example 32 | 144 | 100 | 4.32 | 3.54 | 2.16 |

Comparative Example 5 and Examples 33 to 40

Electrode materials of Comparative Example 5 and Examples 33 to 40 were produced in the same manner as in Comparative Example 1 and Examples 1 to 8, except that an aluminum powder with an average particle diameter $D_{50}$ of 80.0 µm was used instead of an aluminum powder with an average particle diameter $D_{50}$ of 3.0 µm. The capacitances of the obtained electrode materials were measured. Table 5 shows the results.

TABLE 5

| | Capacitance (µF/10 cm²) Chemical Conversion Voltage | | | | |
|---|---|---|---|---|---|
| | 5 V | 10 V | 250 V | 400 V | 550 V |
| Comparative Example 5 | 30 | 22 | 1.72 | 1.03 | 0.71 |
| Example 33 | 35 | 25 | 1.88 | 1.11 | 0.76 |
| Example 34 | 30 | 23 | 1.85 | 1.11 | 0.77 |
| Example 35 | 38 | 27 | 1.97 | 1.18 | 0.8 |
| Example 36 | 57 | 40 | 1.7 | 1.03 | 0.72 |
| Example 37 | 42 | 31 | 2.08 | 1.25 | 0.85 |
| Example 38 | 64 | 47 | 1.79 | 1.09 | 0.74 |
| Example 39 | 45 | 33 | 2.15 | 1.27 | 0.9 |
| Example 40 | 68 | 50 | 1.8 | 1.07 | 0.75 |

Results

The results for Comparative Example 1 and Examples 1 to 8 were as follows. In Comparative Example 1, since the electrode material was produced by a method without an etching treatment, the capacitance was low in the entire range of chemical conversion voltage, from a low-voltage range of 10V or less to a medium to high voltage of 250 to 550V.

In contrast, since the electrode materials of Examples 1 to 3 were subjected to a chemical etching using an acidic solution, a chemical etching using an alkaline solution, or a DC electrolytic etching, an increase in capacitance compared with Comparative Example 1 was confirmed in a high-voltage range of 250 to 550V. In particular, the capacitance of the electrode material of Example 3 subjected to DC electrolytic etching was increased by 10 to 20% in a high-voltage range of 250 to 550V.

Further, the capacitance of the electrode material of Example 4, which was subjected to AC electrolytic etching, increased in a low-voltage range, i.e., at a chemical conversion voltage of 10V or less, compared with Comparative Example 1.

Further, in Examples 5 to 8 subjected to DC electrolytic etching or AC electrolytic etching after chemical etching using an acidic solution or chemical etching using an alkaline solution, the capacitance increased both in a low-voltage range of 10V or less and a high-voltage range of 250 to 550V, compared with Comparative Example 1.

A result similar to the above was observed between Comparative Example 2 and Examples 9 to 16, between Comparative Example 3 and Examples 17 to 24, between Comparative Examples 4 and Examples 25 to 32, and between Comparative Example 5 and Examples 33 to 40. This shows that the production method of the present invention enables an increase in capacitance of an electrode material for aluminum electrolytic capacitor even when powder having a large average particle diameter ($D_{50}$) is used, and that an electrode material for aluminum electrolytic capacitor having desired characteristics can be produced by performing a suitably selected etching treatment.

The invention claimed is:

1. A method for producing an electrode material for aluminum electrolytic capacitor, comprising the steps of:
   (1) a first step of forming a film of a paste composition containing powder of at least one of aluminum and an aluminum alloy, a binder resin, and a solvent on at least one surface of a substrate,
   (2) a second step of sintering the film, and
   (3) a third step of applying an etching treatment on the sintered film.

2. The method according to claim 1, wherein the etching treatment is at least one selected from the group consisting of chemical etching using an acidic solution, chemical etching using an alkaline solution, DC electrolytic etching, and AC electrolytic etching.

3. The method according to claim 1, wherein the etching treatment first performs chemical etching using an acidic solution or chemical etching using an alkaline solution, and then performs DC electrolytic etching or AC electrolytic etching.

4. The method according to claim 1, wherein the etching treatment is chemical etching using an acidic solution, chemical etching using an alkaline solution, or DC electrolytic etching.

5. The method according to claim 1, wherein the etching treatment is AC electrolytic etching.

6. The method according to claim 1, wherein the powder has an average particle diameter $D_{50}$ of 1 to 80 μm.

7. The method according to claim 1, wherein the sintering temperature is not lower than 560° C. and not higher than 660° C.

8. The method according to claim 1, wherein the thickness of the film after the sintering is 5 to 1000 μm.

* * * * *